(12) United States Patent
Rathfelder

(10) Patent No.: US 10,395,705 B2
(45) Date of Patent: Aug. 27, 2019

(54) INTEGRATED CIRCUIT COPY PREVENTION DEVICE POWERED BY A PHOTOELECTRIC CELL

(71) Applicant: Qualcomm Incorporated, San Diego, CA (US)

(72) Inventor: Peter Rathfelder, Maricopa, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/793,046

(22) Filed: Oct. 25, 2017

(65) Prior Publication Data

US 2019/0122715 A1 Apr. 25, 2019

(51) Int. Cl.
| | |
|---|---|
| *G11C 8/20* | (2006.01) |
| *G06F 12/14* | (2006.01) |
| *H01L 31/048* | (2014.01) |
| *G11C 11/41* | (2006.01) |
| *H01L 23/00* | (2006.01) |
| *H01L 21/822* | (2006.01) |
| *G06F 21/87* | (2013.01) |

(52) U.S. Cl.
CPC ............ *G11C 8/20* (2013.01); *G06F 12/1425* (2013.01); *G06F 21/87* (2013.01); *G11C 11/41* (2013.01); *H01L 21/822* (2013.01); *H01L 23/576* (2013.01); *H01L 31/048* (2013.01)

(58) Field of Classification Search
CPC ....... G11C 11/41; G11C 8/20; G06F 12/1425; H01L 21/822

USPC ..................................................... 365/185.04
See application file for complete search history.

(56) References Cited

U.S. PATENT DOCUMENTS

| | | | | |
|---|---|---|---|---|
| 5,469,557 | A | * | 11/1995 | Salt ........................ G11C 8/20 711/103 |
| 9,189,656 | B1 | * | 11/2015 | Baker ................... G06F 21/554 |
| 2010/0225380 | A1 | | 9/2010 | Hsu et al. |
| 2011/0210782 | A1 | | 9/2011 | Kuenemund et al. |
| 2014/0103286 | A1 | | 4/2014 | Chu et al. |

FOREIGN PATENT DOCUMENTS

EP 3115776 A2 1/2017

OTHER PUBLICATIONS

International Search Report and Written Opinion—PCT/US2018/051698—ISA/EPO—dated Dec. 7, 2018.

* cited by examiner

*Primary Examiner* — Alexander Sofocleous
*Assistant Examiner* — Alfredo Bermudez Lozada
(74) *Attorney, Agent, or Firm* — Robert A. Reid

(57) ABSTRACT

An integrated circuit includes a substrate, a first circuit disposed on the substrate, a photoelectric cell disposed on the substrate and coupled to the first circuit, the photoelectric cell to provide power to the first circuit when the photoelectric cell is exposed to light, and the first circuit to allow disabling at least a portion of the integrated circuit when powered by the photoelectric cell.

24 Claims, 5 Drawing Sheets

INTEGRATED CIRCUIT COPY PREVENTION DEVICE POWERED BY A PHOTOELECTRIC CELL

BACKGROUND

Field

An aspect of the present invention relates to an integrated circuit having a copy prevention device powered by a photoelectric cell.

Background

The design of semiconductor circuits or integrated circuits increasingly involves high costs from both design, labor, and production costs. Increasingly, newly designed integrated circuits are purchased clandestinely by competing semiconductor suppliers for the purpose of obtaining design and structure information, with the intent to copy this information for use in future integrated circuits to be sold. This is accomplished by removing the light blocking plastic covering the integrated circuit, inspecting the integrated circuit through several means, and then often de-processing the circuit through its structure layers to reverse engineer the design. In addition, design information can be extracted by powering up the integrated circuit while inspecting it, to observe the emitted light and emitted electromagnetic radiation from the circuit while powered. What is needed, therefore, is a means of protecting the design information and structure information of integrated circuits.

SUMMARY

In one aspect, an integrated circuit includes a substrate, a first circuit disposed on the substrate, a photoelectric cell disposed on the substrate and coupled to the first circuit, the photoelectric cell to provide power to the first circuit when the photoelectric cell is exposed to light, and the first circuit to allow disabling at least a portion of the integrated circuit when powered by the photoelectric cell.

In another aspect, a computing device includes an integrated circuit including a substrate, a first circuit disposed on the substrate, a photoelectric cell disposed on the substrate and coupled to the first circuit, the photoelectric cell to provide power to the first circuit when the photoelectric cell is exposed to light, and the first circuit to allow disabling at least a portion of the integrated circuit when powered by the photoelectric cell.

In another aspect, an integrated circuit includes a substrate, a first means disposed on the substrate, a second means disposed on the substrate and coupled to the first means, the second means for providing power to the first means when the second means is exposed to light, and the first means for allowing disabling at least a portion of the integrated circuit when powered by the second means.

In another aspect, a method to prevent copying of an integrated circuit, the method including exposing a photoelectric cell to light, providing power to a first circuit by the photoelectric cell after exposing the photoelectric cell to light, and allowing disabling of at least a portion of the integrated circuit by the first circuit when powered by the photoelectric cell.

DETAILED DESCRIPTION

Figure 1:
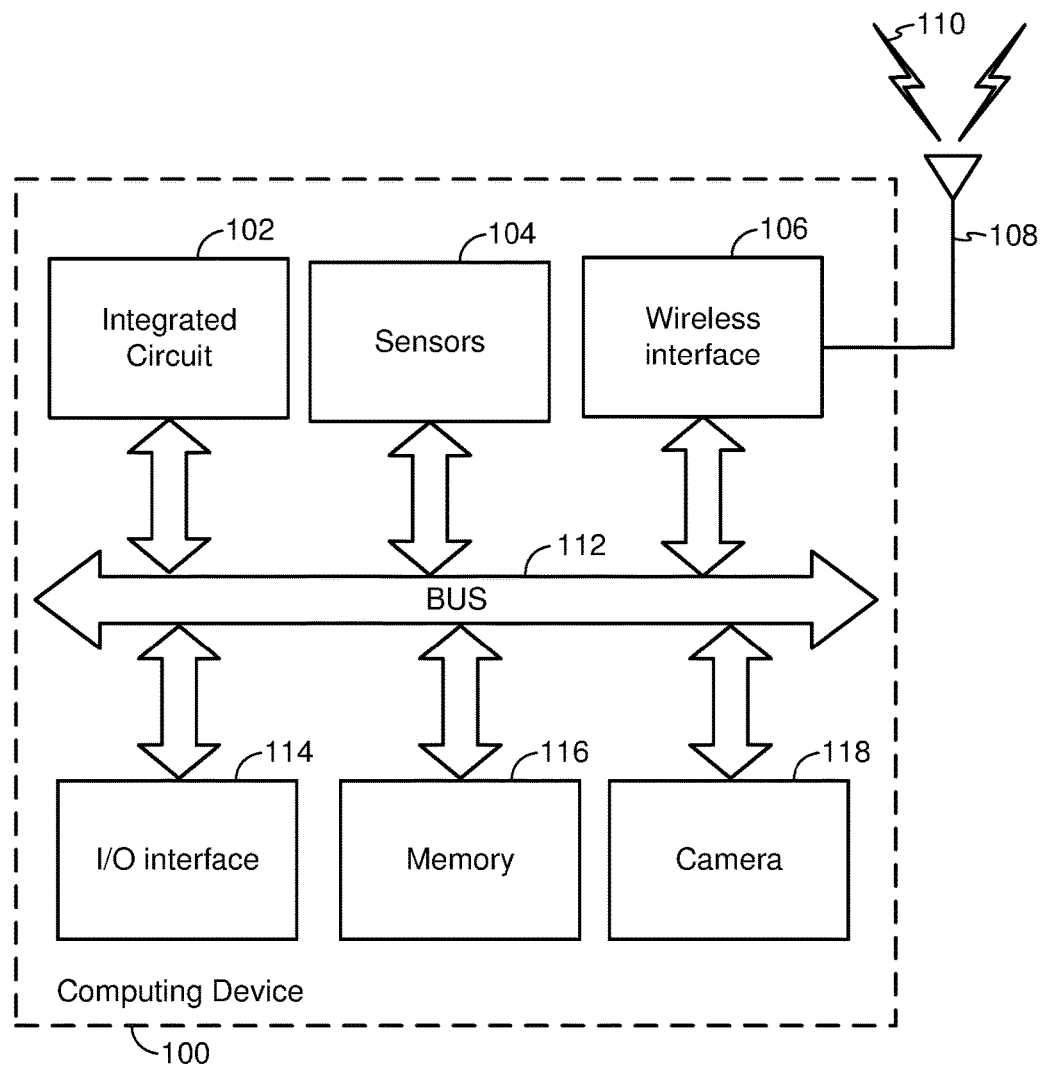
FIG. 1 is a computing device in accordance with an aspect of the invention.

With reference to FIG. 1, a computing device 100 includes an integrated circuit 102, one or more sensors 104, a wireless interface 106, an antenna 110, a bus 112, an I/O interface 114, a memory 116, and a camera 118. Wireless interface 106 can include a wireless receiver, transmitter, transceiver, and/or other elements that enable computing device 100 to send and/or receive data using WWAN, WLAN, and/or other suitable wireless communication protocols. Wireless interface 106 can include one or more multi-mode modems capable of transmitting and receiving wireless signals using multiple wireless communications standards. Wireless interface 106 is connected by a line 108 to antenna 110 for sending and receiving communications to/from other wireless transmitters, a wireless base station, and/or other wireless devices configured to communicate using wireless communication protocols. While computing device 100 illustrated in FIG. 1 includes a single wireless interface 106 and a single antenna 108, other implementations of computing device 100 can include multiple wireless interfaces 106 and/or multiple antennas 110. Computing device 100 can be any suitable electronic device incorporating one or more integrated circuits such as a desktop computer, an Internet of Things (IoT) device or an end user mobile device such as a laptop, a cellphone, a smartphone, or a tablet.

Continuing with FIG. 1, I/O interface 114 can provide one or more ports and/or other interfaces that can provide for data inputs and/or outputs to computing device 100. For example, I/O interface 114 can include one or more ports, such as a Universal Serial Bus (USB) port and/or other type of port that can be used to connect external devices to the computing device. I/O interface 114 can also include one or more input devices, such as buttons, switches, a keypad, a touchscreen and/or other means for receiving input from a user. I/O interface 114 can also include one or more means for outputting audio and/or visual content, such as a screen, a speaker, a headphone port and/or other means for outputting such content.

In one aspect, memory 116 can be a non-transitory storage device that can include random access memory (RAM), read-only memory (ROM), or a combination thereof. Such a memory can store processor-readable, processor-executable software code containing instructions for controlling the processor circuit to perform functions described herein (although the description may read that the software performs the function(s)). The software can be loaded onto the memory by being downloaded via a network connection, uploaded from a disk, etc. Further, the software may not be directly executable, e.g., requiring compiling before execution.

The software in the memory is configured to enable the processing circuit to perform various actions, including implementing sending and/or receiving data from other wireless transmitters, a wireless base station, other computing devices, and/or other devices configured for wireless communication.

Figure 2:
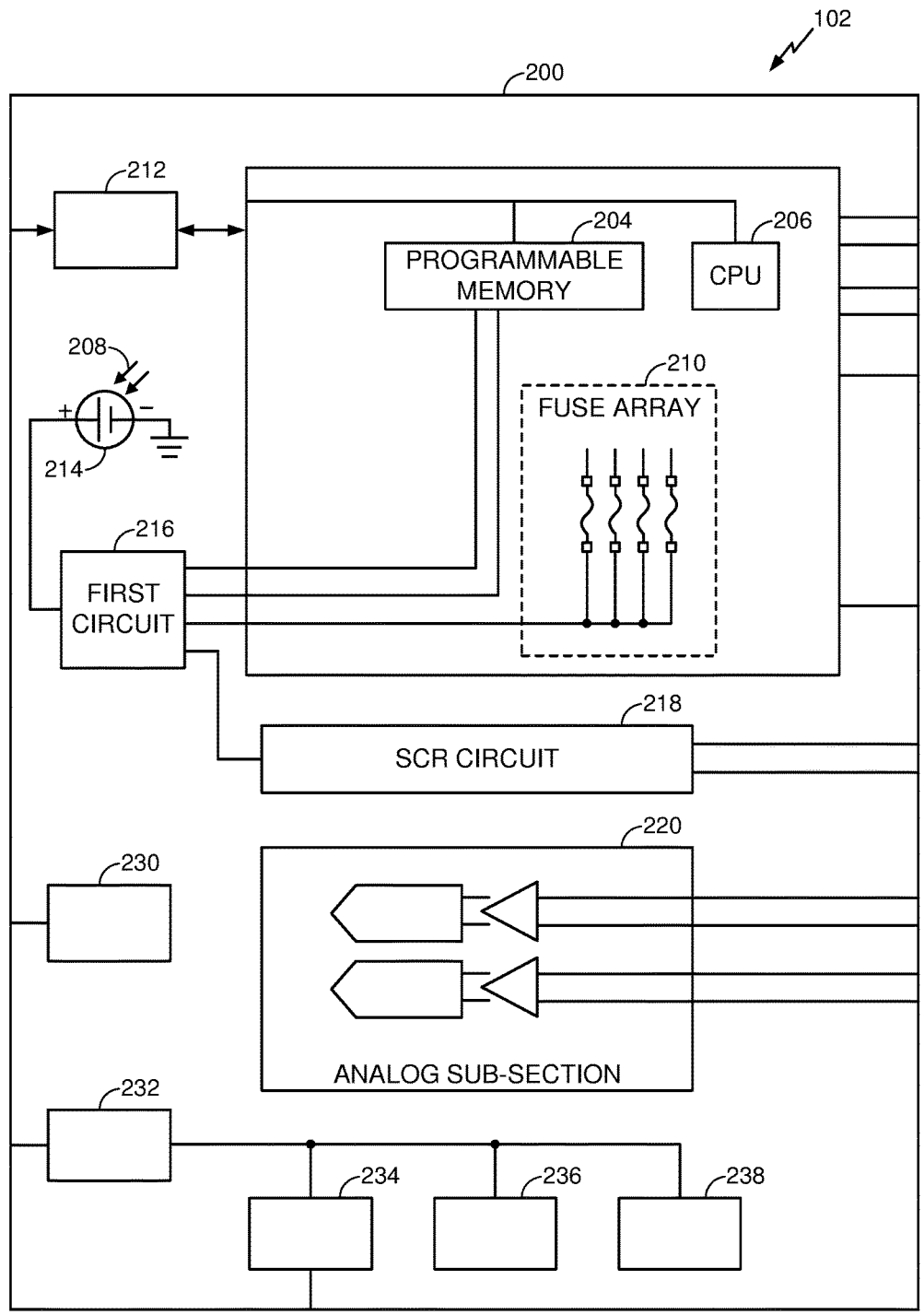
FIG. 2 is the integrated circuit of FIG. 1 in accordance with an aspect of the invention.

With reference to FIG. 2, integrated circuit 102 includes a substrate 200, a first circuit 216 disposed on the substrate 200, a photoelectric cell 214 disposed on the substrate 200 and coupled to the first circuit 216, the photoelectric cell 214 to provide power to the first circuit 216 when the photoelectric cell 214 is exposed to light, and the first circuit 216 to allow disabling at least a portion of the integrated circuit 102 when powered by the photoelectric cell 214. In one aspect, photoelectric cell 214 may include one or more solar cell diodes generating about one microamp in current. Integrated circuit 102 further includes a fuse array 210 (one or more fuses) coupled to the first circuit 216, the fuse array 210 when blown after power is supplied to the integrated circuit 102, to disable one or more portions of the integrated circuit 102. Integrated circuit 102 further includes a programmable memory 204 coupled to the first circuit 216, the first circuit 216 to disable the at least a portion of the integrated circuit 102 via a change in a portion of the programmable memory 204 after power is supplied to the integrated circuit 102. In one aspect, the change in a portion of the programmable memory 204 is to erase the portion of the programmable memory 204. In another aspect, the change in a portion of the programmable memory 204 is to re-program the portion of the programmable memory 204.

Continuing with FIG. 2, integrated circuit 102 further includes a silicon controlled rectifier circuit 218 to damage the integrated circuit 102 after power is supplied to the integrated circuit 102. Integrated circuit 102 further includes a disable circuit (to be described in more detail below) to disable the first circuit 216. Integrated circuit further includes a CPU 206, an analog sub-section 220, and one or more optional additional circuits 212, 230, 232, 234, 236, and 238 which are circuits that may be typically included in an integrated circuit such as a silicon based semiconductor integrated circuit. Such additional circuits are not shown to simplify the description of aspects of the invention. As shown in FIG. 2, an unauthorized removal of the black plastic (not shown) of integrated circuit 102 has occurred, and the chip surface of integrated circuit 102 is exposed to light 208. Light 208 can be any suitable light such as the light from a microscope. When photoelectric cell 214 is exposed to light 208, it powers first circuit 216 such that one or more outputs of first circuit 216 are permanently set (to be described in more detail below). This prevents the copying of integrated circuit 102 when power is later applied to the integrated circuit.

Figure 3C:
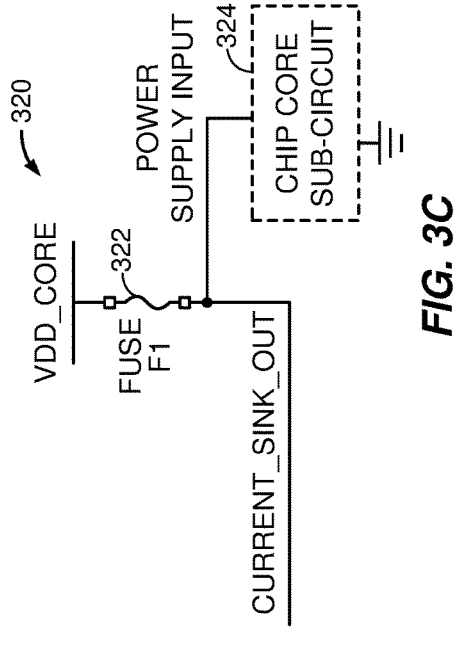
FIGS. 3A-3D are various aspects of the integrated circuit of FIG. 2.
Figure 3A:
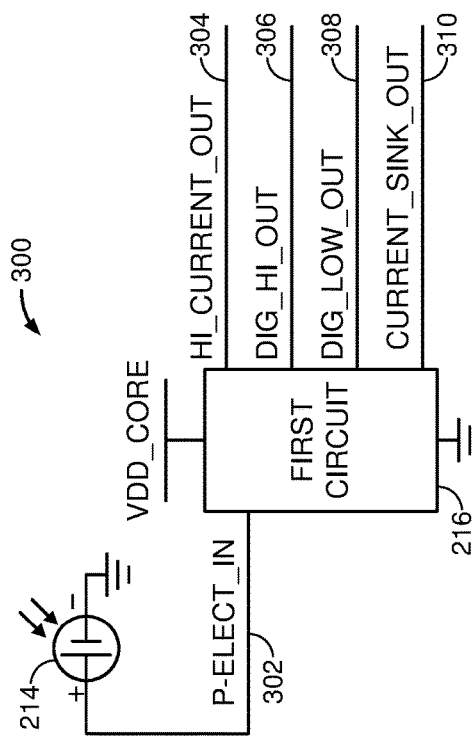

With reference to FIG. 3A, a portion 300 of integrated circuit 102 of FIG. 2 is shown which includes photoelectric cell 214 coupled to first circuit 216. First circuit 216 receives as input 302 (P-ELECT_IN) power from photoelectric cell 214 when photoelectric cell 214 is exposed to light and generates one or more outputs 304, 306, 308, and 310 which are permanently set. Outputs 304-310, correspond, respectively, to a high current output (HI_CURRENT_OUT), a digital high output (DIG_HI_OUT), a digital low output (DIG_LOW_OUT), and a current sink output (CURRENT_SINK_OUT).

Figure 4:
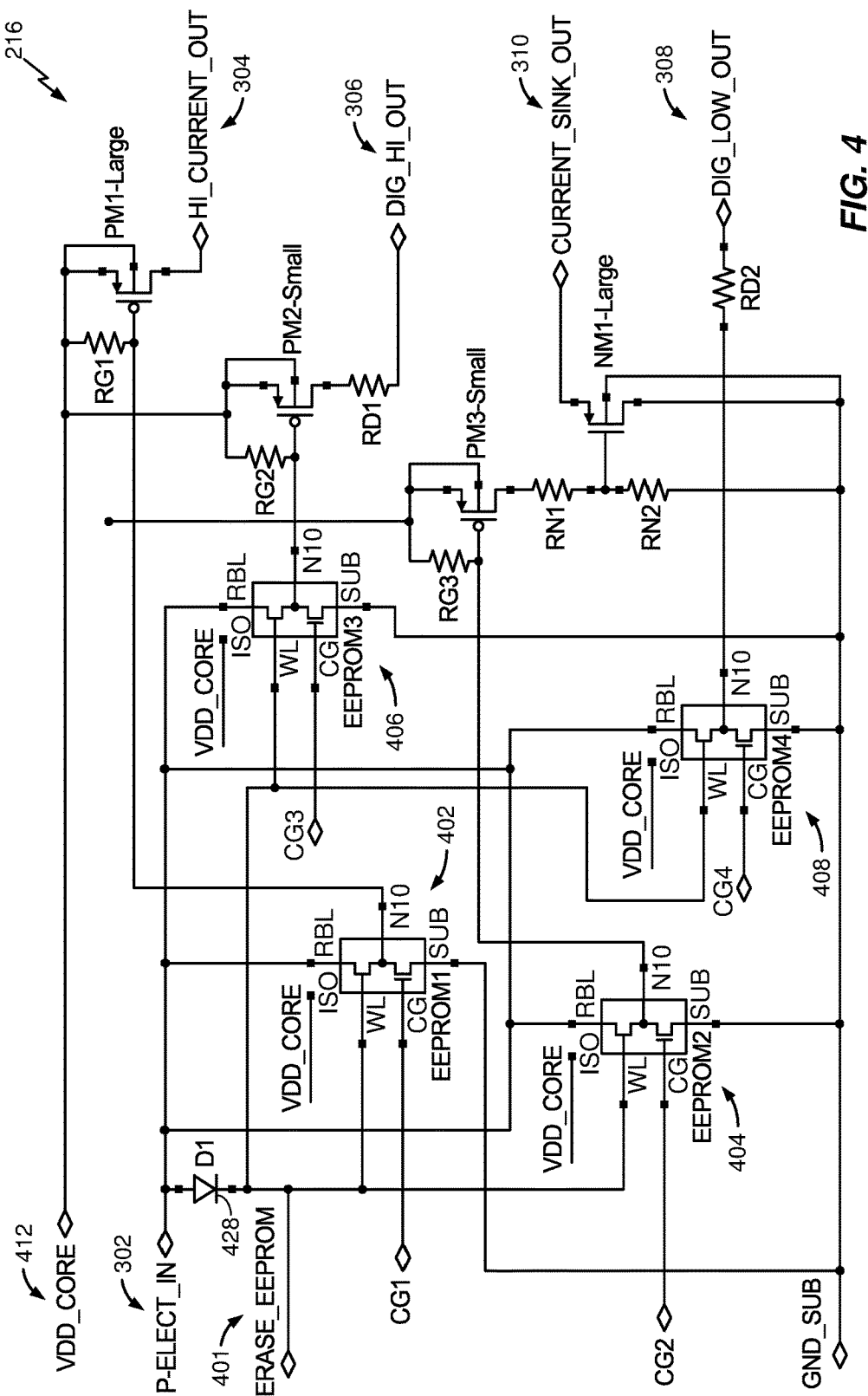
FIG. 4 is a more detailed view of the first circuit shown in FIG. 2.

With reference to FIGS. 3A and 4, a sequence of integrated circuit protection will be described in which access to the silicon surface is not authorized by the manufacturer of the integrated circuit. After unauthorized removal of the chip black plastic covering the integrated circuit and after light is shown on the chip surface:

1. Photoelectric cell 214 generates suitable power from the light and supplies it through the "P-Elect_IN" node/input 302 to first circuit 216.

2. As shown in FIG. 4, the power from photoelectric cell 214 sets the state of EEPROMs 1-4 (402, 404, 406, 408), via the RBL (Read Bit Line) or power line, causing a low resistance path in each EEPROM cell from "N10" to "SUB" (ground substrate). In other words, each EEPROM output "N10" is permanently set to ground (GND_SUB). Each control gate (CG1-CG4) is left floating, i.e., these control gates are not used. The PMOS (PM1-large, PM2-small, PM3-small) and NMOS (NM1-large) transistors transition from a disabled state to an enabled state. Each of the RG (RG1-RG3) and RD (RD1-RD2) resistors are suitably 4K ohms and each RN (RN1-RN2) resistor is suitably 50 ohms.

3. Once the state of the EEPROM circuit is set, power from "P-Elect_IN" 302 is no longer required. The EEPROM states are permanently set. Removing the light hitting the silicon surface does not disable the chip protection.

After the previous step (i.e., after the chip surface is exposed to light), and after whole integrated circuit is powered up (chip power net "VDD_CORE" receives suitably 1.8V power):

4. First circuit 216 outputs begin their one or more functions as described below to prevent copying of the integrated circuit as described above.

4a. Node/output 304 "HI_CURRENT_OUT" continuously supplies a large current from VDD_CORE 412 to the "HI_CURRENT_OUT" node/output 304, via PM1-large transistor which is now in an on state. The "HI_CURRENT_OUT" node 304 is used to power silicon controlled rectifier (SCR) circuit 218 (see FIG. 3D) which causes physical damage to integrated circuit 102.

4b. The node 306 "DIG_HI_OUT" continuously emits a digital "1" (High) signal to be used to erase or reprogram the on-chip programmable memory 204 (see FIG. 3B), via RD1 and PM2-small transistor which is now in an on state.

4c. The "CURRENT_SINK_OUT" node 310 continuously provides a high current short to "GND_SUB" which is used to blow one or more fuses which disables portions of the integrated circuit/chip (see FIG. 3C).

4d. The node 308 "DIG_LOW_OUT" continuously emits a digital "0" (Low) signal used to erase or reprogram the on-chip programmable memory 204 (see FIG. 3B). One or more of the above described functions (4a-4d) may be included in an integrated circuit. Multiple copies of any of the above described functions (4a-4d) may also be included in an integrated circuit.

Figure 3D:
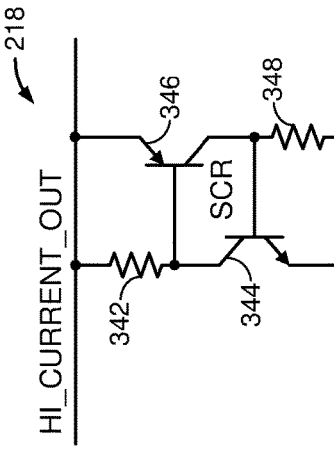
Figure 3B:
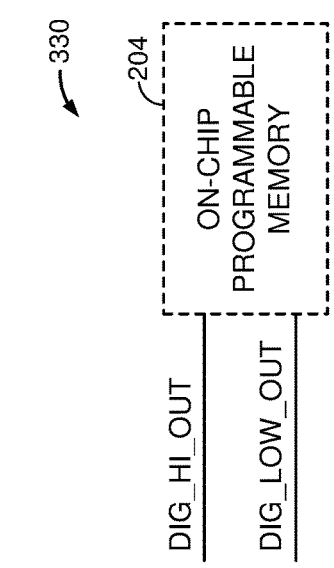

With reference to FIG. 3B, a portion 330 of FIG. 2 is shown in which one or more portions of programmable memory 204 containing the integrated circuit's firmware may be erased or re-programmed via DIG_HI_OUT and/or DIG_LOW_OUT input signals. Such an erasure or re-programming disables the integrated circuit.

With reference to FIG. 3C, a portion 320 of FIG. 2 is shown in which the "CURRENT_SINK_OUT" node 310 continuously provides a high current short to "GND_SUB" which is used to blow one or more fuses which disables portions of the integrated circuit. The one or more fuses 322 are blown after the integrated circuit is powered up which cuts off the power supply input to one or more chip core sub-circuits 324 thereby disabling portions of the integrated circuit or disabling the entire integrated circuit.

With reference to FIG. 3D, the HI_CURRENT_OUT signal is applied to SCR circuit 218 which includes resistors 342, 348 and transistors 344, 346. When power is supplied to integrated circuit 102, SCR circuit 218 heats and damages (e.g., burns) the integrated circuit's silicon.

In order to allow authorized access to the integrated circuit, first circuit 216 may be disabled. Such an authorized access may be needed to test or debug the integrated circuit during the manufacturing process or post-manufacture. Before removing the chip black plastic covering, integrated circuit 102 is powered. As shown in FIG. 4, a command is issued to erase and disable the EEPROM circuit within first circuit 216 using the "ERASE_EEPROM" node 401 which is connected to each word line (WL) of EEPROMs 1-4. Then, the chip black plastic covering can be removed and light can be shown on the silicon chip surface without engaging the first circuit outputs. No fuses will be blown, SCR circuit 218 will not receive power, and programmable memory 204 will not be affected. In this case, the four first circuit 216 outputs, HI_CURRENT_OUT, DIG_HI_OUT, CURRENT_SINK_OUT, and DIG_LOW_OUT will be disabled and non-functional.

Figure 5:
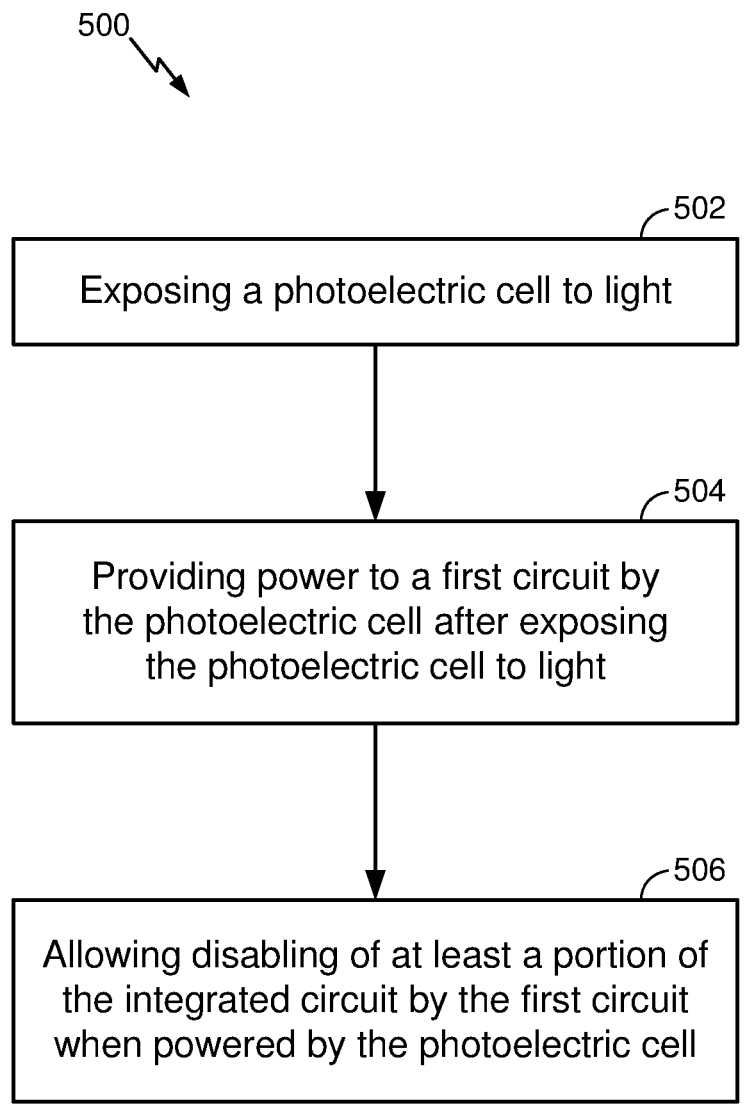
FIG. 5 is a flow diagram in accordance with an aspect of the invention.

With reference to FIG. 5, a flow diagram to prevent copying of an integrated circuit is shown which includes exposing a photoelectric cell to light at 502, providing power to a first circuit by the photoelectric cell after exposing the photoelectric cell to light at 504, and allowing disabling of at least a portion of the integrated circuit by the first circuit when powered by the photoelectric cell at 506.

According to one aspect of the invention, an integrated circuit includes a substrate (for example, substrate 200, see FIG. 2), a first means (for example, first circuit 216, see FIGS. 2 and 4) disposed on the substrate, a second means (for example, photoelectric cell 214, see FIG. 2) disposed on the substrate and coupled to the first means, the second means for providing power to the first circuit when the second means is exposed to light, and the first means for allowing disabling at least a portion of the integrated circuit when powered by the second means. The integrated circuit further includes a third means (for example, fuse array 210 or fuse 322, see FIGS. 2 and 3C) coupled to the first means, the third means when blown after power is supplied to the integrated circuit, for disabling one or more portions of the integrated circuit. The integrated circuit further includes means for storing data (for example, programmable memory 204, see FIG. 2) and coupled to the first means, the first means for disabling the at least a portion of the integrated circuit via a change in a portion of the means for storing data after power is supplied to the integrated circuit. The integrated circuit further includes means for damaging (for example, SCR circuit 218, see FIGS. 2 and 3D) the integrated circuit after power is supplied to the integrated circuit and means for disabling (for example, ERASE_EEPROM 401, EEPROMs 1-4, see FIG. 4) the first circuit.

A processor (aka, processing circuit) may be any programmable microprocessor, microcomputer or multiple processor chip or chips that can be configured by software instructions (applications) to perform a variety of functions, including the functions of the various aspects described above. In some devices, multiple processors may be provided, such as one processor dedicated to wireless communication functions and one processor dedicated to running other applications. Typically, software applications may be stored in the internal memory before they are accessed and loaded into the processor. Processor may include internal memory sufficient to store the application software instructions. In many devices, the internal memory may be a volatile or nonvolatile memory, such as flash memory, or a mixture of both. For the purposes of this description, a general reference to memory refers to memory accessible by a processor including internal memory or removable memory plugged into the device and memory within the processor itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory, computer-readable or processor-readable storage media may be any storage media that may be accessed by a computer or a processor. By way of example but not limitation, such non-transitory, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory, computer-readable and processor-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. An integrated circuit comprising:
a substrate;
a first circuit disposed on the substrate;
a photoelectric cell disposed on the substrate and coupled to the first circuit, the photoelectric cell to provide power to the first circuit when the photoelectric cell is exposed to light;
the first circuit to allow disabling at least a portion of the integrated circuit when powered by the photoelectric cell; and
a silicon controlled rectifier circuit to damage the integrated circuit after power is supplied to the integrated circuit.

2. The integrated circuit of claim 1, further comprising:
a fuse array coupled to the first circuit, the fuse array when blown after power is supplied to the integrated circuit, to disable one or more portions of the integrated circuit.

3. The integrated circuit of claim 1, further comprising:
a programmable memory coupled to the first circuit, the first circuit to disable the at least a portion of the integrated circuit via a change in a portion of the programmable memory after power is supplied to the integrated circuit.

4. The integrated circuit of claim 3, wherein the change in a portion of the programmable memory is to erase the portion of the programmable memory.

5. The integrated circuit of claim 3, wherein the change in a portion of the programmable memory is to re-program the portion of the programmable memory.

6. The integrated circuit of claim 1, further comprising:
a disable circuit to disable the first circuit.

7. A computing device comprising:
an integrated circuit including:
a substrate;
a first circuit disposed on the substrate;
a photoelectric cell disposed on the substrate and coupled to the first circuit, the photoelectric cell to provide power to the first circuit when the photoelectric cell is exposed to light;
the first circuit to allow disabling at least a portion of the integrated circuit when powered by the photoelectric cell; and
a silicon controlled rectifier circuit to damage the integrated circuit after power is supplied to the integrated circuit.

8. The computing device of claim 7, further comprising:
a fuse array coupled to the first circuit, the fuse array when blown after power is supplied to the integrated circuit, to disable one or more portions of the integrated circuit.

9. The computing device of claim 7, further comprising:
a programmable memory coupled to the first circuit, the first circuit to disable the at least a portion of the integrated circuit via a change in a portion of the programmable memory after power is supplied to the integrated circuit.

10. The computing device of claim 9, wherein the change in a portion of the programmable memory is to erase the portion of the programmable memory.

11. The computing device of claim 9, wherein the change in a portion of the programmable memory is to re-program the portion of the programmable memory.

12. The computing device of claim 7, further comprising:
a disable circuit to disable the first circuit.

13. An integrated circuit comprising:
a substrate;
a first means disposed on the substrate;
a second means disposed on the substrate and coupled to the first means, the second means for providing power to the first means when the second means is exposed to light;
the first means for allowing disabling at least a portion of the integrated circuit when powered by the second means; and
a silicon controlled rectifier circuit to damage the integrated circuit after power is supplied to the integrated circuit.

14. The integrated circuit of claim 13, further comprising:
a third means coupled to the first means, the third means when blown after power is supplied to the integrated circuit, for disabling one or more portions of the integrated circuit.

15. The integrated circuit of claim 13, further comprising:
means for storing data and coupled to the first means, the first means for disabling the at least a portion of the integrated circuit via a change in a portion of the means for storing data after power is supplied to the integrated circuit.

16. The integrated circuit of claim 15, wherein the change in a portion of the means for storing data is to erase the portion of the means for storing data.

17. The integrated circuit of claim 15, wherein the change in a portion of the means for storing data is to re-program the portion of the means for storing data.

18. The integrated circuit of claim 13, further comprising:
means for disabling the first means.

19. A method to prevent copying of an integrated circuit, the method comprising:
exposing a photoelectric cell to light;
providing power to a first circuit by the photoelectric cell after exposing the photoelectric cell to light;
allowing disabling of at least a portion of the integrated circuit by the first circuit when powered by the photoelectric cell; and
allowing a silicon controlled rectifier circuit to damage the integrated circuit after power is supplied to the integrated circuit.

20. The method of claim 19, further comprising:
blowing one or more fuses after power is supplied to the integrated circuit; and
disabling one or more portions of the integrated circuit.

21. The method of claim 19, further comprising:
disabling the at least a portion of the integrated circuit via a change in a portion of a programmable memory after power is supplied to the integrated circuit.

22. The method of claim 21, wherein the change in a portion of the programmable memory is erasing the portion of the programmable memory.

23. The method of claim 21, wherein the change in a portion of the programmable memory is re-programming the portion of the programmable memory.

24. The method of claim 19, further comprising:
disabling the first circuit.

* * * * *